United States Patent [19]
Dail

[11] Patent Number: 5,963,844
[45] Date of Patent: *Oct. 5, 1999

[54] HYBRID FIBER-COAX SYSTEM HAVING AT LEAST ONE DIGITAL FIBER NODE AND INCREASED UPSTREAM BANDWIDTH

[75] Inventor: James E. Dail, Marlboro, N.J.

[73] Assignee: AT&T Corp., Middletown, N.J.

[ * ] Notice: This patent is subject to a terminal disclaimer.

[21] Appl. No.: 08/718,104

[22] Filed: Sep. 18, 1996

[51] Int. Cl.⁶ .................................................. H04N 7/173
[52] U.S. Cl. .............................................. 455/5.1; 348/12
[58] Field of Search .............................. 348/6, 7, 10, 11, 348/12, 13, 14, 15, 16, 17, 18; 455/3.1, 4.1, 4.2, 5.1, 6.1, 6.2, 6.3, 14; 375/211, 214; H04N 7/16, 7/173

[56] References Cited

U.S. PATENT DOCUMENTS

| | | | |
|---|---|---|---|
| 3,835,393 | 9/1974 | Marron | 455/5.1 |
| 5,390,337 | 2/1995 | Jelinek et al. | 455/5.1 |
| 5,408,259 | 4/1995 | Warwick | 348/6 |
| 5,499,047 | 3/1996 | Terry et al. | 348/6 |
| 5,534,912 | 7/1996 | Kostreski | 348/6 |
| 5,557,319 | 9/1996 | Gurusami et al. | 348/11 |
| 5,606,725 | 2/1997 | Hart | 455/5.1 |
| 5,625,865 | 4/1997 | Moehrmann | 455/4.2 |

*Primary Examiner*—Chris Grant
*Attorney, Agent, or Firm*—Robert B. Levy

[57] ABSTRACT

Increased upstream bandwidth and reduced ingress noise in a shared hybrid fiber-coax transmission system (100) are obtained by modulating at least a portion of upstream signals received from subscribers to a high frequency band (e.g., 750–1000 MHz), thereby increasing the upstream bandwidth. The high frequency upstream signals are then digitally regenerated in the coaxial cable (200) plant prior to receipt at a fiber node (180). At the fiber node, the high-frequency upstream signals are again digitally regenerated and are then transmitted optically in a baseband digital format between the fiber node (180) and a head end (120). The digital regeneration of the high frequency upstream signals, and the optical transmission of such signals in a baseband digital format reduces the incidence of ingress noise.

10 Claims, 2 Drawing Sheets

HYBRID FIBER-COAX SYSTEM HAVING AT LEAST ONE DIGITAL FIBER NODE AND INCREASED UPSTREAM BANDWIDTH

BACKGROUND ART

This invention relates to a technique for reducing ingress noise in a share hybrid fiber-coax transmission system and for providing increased upstream bandwidth.

TECHNICAL FIELD

There now exist transmission systems that provide two-way transmission of information; e.g., video, audio, multimedia and/or data; between a head end and a plurality of subscribers. Typically, the head end transmits the information destined for individual subscribers ("downstream information") in an optical format, via one or more fiber optic links, to one or more fiber nodes. Each fiber node converts the optically-formatted downstream information into electrical signals for distribution, via a coaxial cable plant having a tree and branch architecture, to individual subscribers.

In addition to receiving the downstream information, each individual subscriber may generate information; in the form of voice, video, data, or any combination thereof; destined for the head end. The subscriber-generated information ("upstream information") is aggregated by the coaxial cable plant and passes to the fiber node for conversion into an optical format for transmission to the head end. The bandwidth (e.g., 5–40 MHz) associated with the upstream information is shared by all subscribers served by the same fiber node. Any noise and/or electrical interference (hereinafter, "noise") originating at an individual subscriber premises aggregates with the noise at the other subscriber premises, degrading the overall quality of the upstream information. Noise measurements in present day cable systems have shown that noise and interference ("noise") are very high in the 5–40 MHz band. There are numerous sources of noise in this frequency band. For example, amateur, citizens band, and mobile radio systems all operate in the 5–40 MHz band and constitute a source of noise. Home appliances also generate noise in the 5–40 MHz band. The aggregation (summing) of the upstream information may simplify the overall transmission but results in a compromise in signal quality and bandwidth availability.

In U.S. patent application Ser. No. 08/650,683, "Shared Hybrid fiber-Coax Network Having Reduced Ingress Noise," filed May 20, 1996, and assigned to AT&T Corp., (herein incorporated by reference), a hybrid fiber-coax transmission system is disclosed in which the upstream information is digitally regenerated within the coax distribution system to reduce ingress noise. In this way, the upstream information received at each fiber node is substantially noise free. However, present day fiber nodes typically convert the upstream information into an optical format via a linear electrical-to-optical converter. The linear electrical-to-optical converters used in present day hybrid fiber-coax networks have limited dynamic range and are influenced by the presence of noise and/or interference at their inputs. As a result, the upstream information transmitted back to the head end by each fiber node may still suffer an impairment in terms of signal quality and bandwidth availability. Also, the cost and complexity of linear optical transmitters and receivers are greater than that of comparable digital devices.

Another proposed solution is to employ so-called Mini-Fiber-Nodes (mFNs) wherein additional fibers run from the head-end to trunk and line extender amplifier locations in the coaxial cable plant. The mFNs are co-located with the trunk and line extender amplifier locations and employ a relatively inexpensive laser to transmit signals back to the head end. This solution also overcomes the problem of ingress noise by operating in a higher frequency band (750–1000 MHz) as well as the small number of HouseHolds Passed (HHPs) per mini-fiber node. Further, this solution provides a sufficient amount of bandwidth for the upstream information. However, the cost of running such fibers is significant.

Thus, there is a need for reducing the incidence of noise in a shared hybrid fiber-coax transmission system attributable to conversion of upstream information into an optical format for transmission to the head end and for increasing the upstream bandwidth.

BRIEF SUMMARY OF THE INVENTION

Briefly, in accordance with a preferred embodiment of the invention, ingress noise in a shared hybrid fiber-coax system in which upstream information is transmitted from the subscribers to the head end, can be reduced by digitally modulating at least a portion of the upstream information via a carrier to a high frequency band (typically 750–1000 MHz) that is allocated for upstream information transmission. The high frequency subscriber generated upstream information is then regenerated through uplink regenerators, as taught in co-pending patent application Ser. No. 08/650, 683 (incorporated by reference herein). However, at the fiber node, the upstream signal, and particularly, the high frequency upstream information that was previously digitized by the regenerator, is not reconverted to an analog signal. Instead, the digitized upstream information is transmitted in a digital baseband, optical format across an optical fiber to the head end, as taught in U.S. patent application Ser. No. 08/678,836, "Hybrid Fiber Coax System Having At Least One Digital Fiber Node", filed in the name of James E. Dail on Jul. 12, 1996, and assigned to AT&T Corp. (herein incorporated by reference).

DETAILED DESCRIPTION

Figure 1:
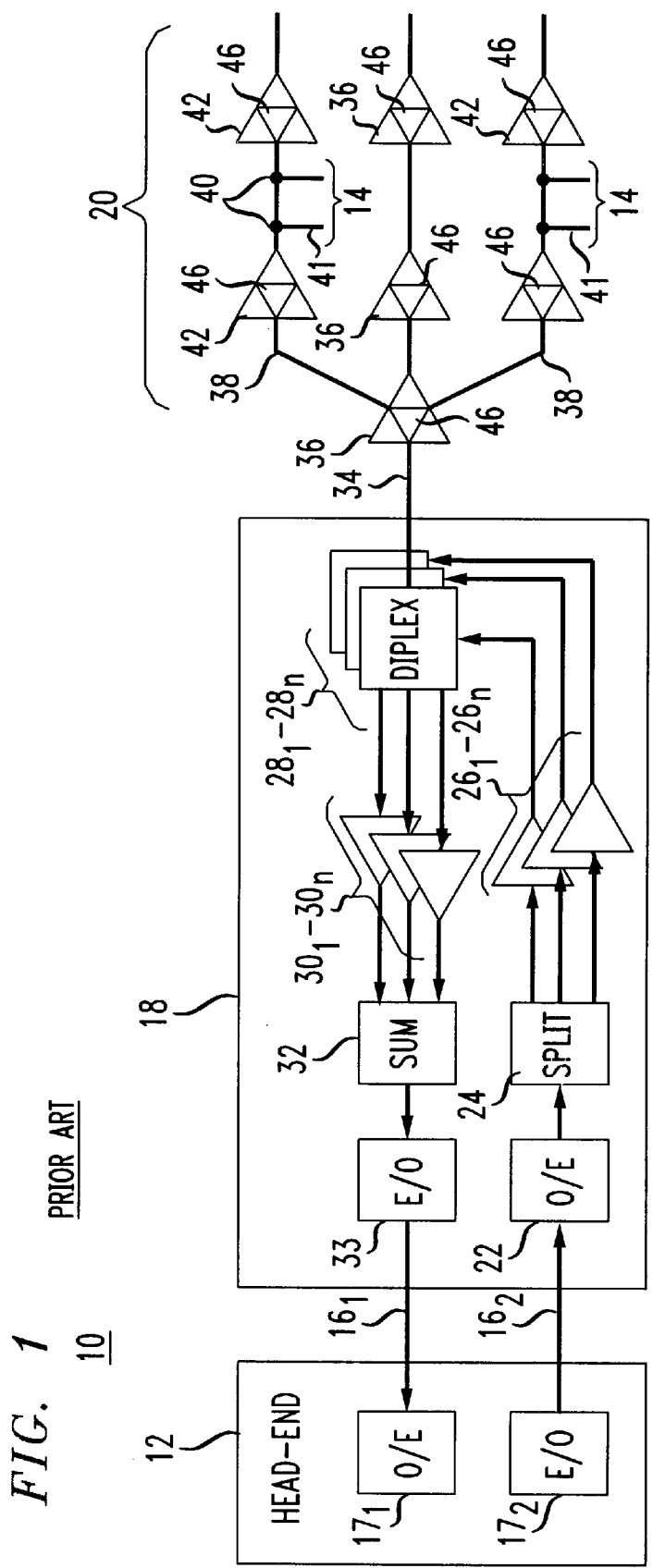
FIG. 1 is a block schematic diagram of a hybrid fiber-coax transmission system in accordance with the prior art.

FIG. 1 depicts a hybrid fiber-coax transmission system 10 in accordance with the prior art. The system 10 includes a head end 12 for generating information; e.g., video, audio, multimedia and/or data ("downstream information"); for transmission to individual subscribers 14—14. The head end also receives information, ("upstream information"); e.g., video, audio, multimedia and/or data; generated by one or more of the subscribers 14—14.

In practice, a combination of optical fibers and coaxial cables carry the downstream information from the head end 12 to the subscribers 14—14 and carry the upstream information from the subscribers to the head end. As seen in FIG. 1, an optical fiber link $16_1$ carries upstream information in a linear optical format from a fiber node 18 to the head end 12. At the head end 12, an optical-to-electrical (O/E) converter $17_1$ converts the optically formatted information upstream information into electrical signals for subsequent processing. An electrical-to-optical (E/O) converter $17_2$ within the head end 12 optically formats downstream information for transmission via a downstream fiber $16_2$ to the fiber node 18 for distribution to subscribers 14—14 via a coaxial cable plant 20 that also functions to carry upstream signals from the subscribers to the fiber node.

The fiber node 18 according to the prior art typically includes a linear O/E converter 22 for converting the optically-formatted downstream information, received via the fiber link 16$_2$, into a downstream electrical signal. A splitter 24 splits the downstream electrical signal produced by the O/E converter 22 into n downstream sub-signals (where n is an integer). Each of amplifiers 26$_1$–26$_n$ amplifies a separate one of the n downstream sub-signals from the O/E converter 22 to supply an amplified sub-signal to a separate one of diplexers 28$_1$–28$_n$, respectively. Each of the diplexers 28$_1$–28$_n$ supplies an individual trunk in the coaxial cable distribution plant 20 with a separate downstream sub-signal and to strip-off a separate one of n upstream signals received via the coaxial distribution plant from the subscribers 14—14.

The n upstream signals separated by diplexers 28$_1$–28$_n$, respectively, are individually amplified by a separate one of amplifiers 30$_1$–30$_n$. A summer 32 sums the individual signals amplified by the amplifiers 30$_1$–30$_n$, to yield a composite signal that is converted into an optical format that is analog modulated via an E/O converter 33 having a linear transmitter (not shown). The analog modulated, optically-formatted signal produced by the E/O converter 33 passes via the optical fiber link 16$_1$ to the head end 12.

The coaxial cable distribution network 20 comprises at least one, and as many as n main coaxial cable trunks 34—34 (only one shown). In practice, n is three or four. Typically, one or more trunk amplifiers 36—36 are disposed along each main trunk 34 for amplifying the upstream and downstream information and for supplying signals to, and receiving signals from one or more coaxial cable branches 38—38. Each branch 38 has one or more taps 40—40 connected to one or more individual subscribers 14—14 via feeders 41—41. One or more branch amplifiers (line extenders) 42—42 may be disposed along each branch 38 to amplify the upstream and downstream information passing therealong.

The hybrid fiber-coax transmission system 10 of FIG. 1 suffers from the disadvantage that ingress noise originating from individual subscribers 14—14 tends to aggregate, impairing performance of the system. Further, the upstream information generated by the subscribers 14—14 has traditionally been modulated to the 5–40 MHz frequency band, limiting system performance due to other electrical noise in that band.

Figure 2:
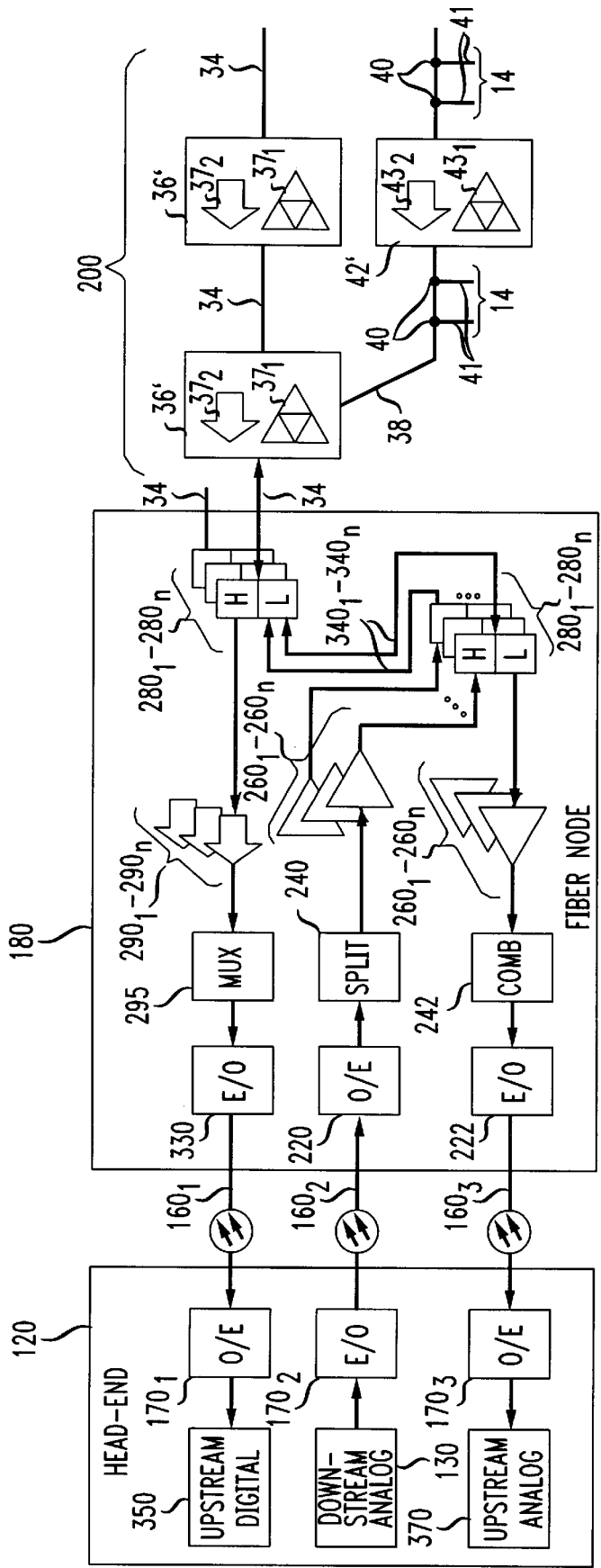
FIG. 2 is a block schematic diagram of a hybrid fiber-coax system in accordance with the teachings of the invention.

FIG. 2 depicts a hybrid fiber-coax transmission system 100 in accordance with the present invention that reduces the incidence of ingress noise and that affords greater upstream bandwidth The system 100 comprises a head end 120 that originates analog downstream information at a source 130 for conversion, via an E/O converter 170$_2$, to an optical format for transmission along an optical fiber link 160$_2$ to a fiber node 180. As will be discussed, the fiber node 180 converts the optically formatted downstream signal into an electrical signal for distribution via a coaxial cable plant 200 to individual subscribers 14—14.

The coaxial cable plant 200 depicted in FIG. 2 is configured in the manner taught in U.S. patent application Ser. No. 08/687,818, filed on Jul. 26, 1996, in the name of M. Javad Peyrovian, and assigned to AT&T Corp., herein incorporated by reference. To that end, the cable plant 200 includes at least one, and as many as four coaxial cable trunks 34 (only one being shown). Disposed along each trunk 34 is one or more trunk amplifiers 36'—36', each comprised of an amplifier element 37$_1$ and a regenerator element 37$_2$ configured the same as the trunk amplifier element and the trunk regenerator element, respectively, described in the aforementioned U.S. patent application Ser. No. 8/687,818 incorporated by reference herein. One or more of the trunk amplifiers 36'—36' may feed a branch 38 to which individual subscribers 14—14 are coupled via individual taps 40—40 and feeders 41—41. Disposed along each branch 38 is at least one line extender (amplifier) 42' comprised of a line extender amplifier element 43$_1$ and a line extender regenerator element 43$_2$. The line extender amplifier element 43$_1$ and the line extender regenerator element 43$_2$ are configured the same as the line extender amplifier element and the line extender regenerator element, respectively, described in the aforementioned U.S. patent application Ser. No. 08/687,818.

In accordance with the teachings in the aforementioned U.S. patent application Ser. No. 08/687,818, greater upstream bandwidth is obtained by digitally modulating at least a portion of the upstream information via a carrier to a high frequency band (typically 750–1000 MHz) that is allocated for upstream information transmission. The high frequency subscriber generated upstream information is then regenerated. Such digital modulation and regeneration of at least a portion of the subscriber-generated upstream information is accomplished by the regenerator elements 43$_2$ and 37$_2$ in each line extender and trunk amplifier 42' and 36', respectively. The amplifier elements 43$_1$ and 37$_1$ within each line extender 42' and trunk amplifier 36', respectively, serve to separate the downstream signals (those typically within the 50–750 MHz band) from low frequency (e.g., 5–40 MHz) upstream information. The amplifier elements 43$_1$ and 37$_1$ within each line extender 42' and trunk amplifier 36', respectively, amplify the downstream signal for ultimate distribution to subscribers and amplify the low frequency upstream signals for transmission back to the fiber node 180.

In accordance with the invention, each trunk 34 of the coaxial cable plant 200 carries upstream information that is modulated to a frequency band of 750 MHz–1000 MHz as well as upstream information modulated to the 5–40 MHz frequency band. To separate the upstream information in the 5–40 and 750–1000 MHz bands and the downstream information in the 50–750 MHz band, the fiber node 180 of the invention includes a plurality of first diplexers 280$_{1–280n}$, each associated with a separate trunk 34 of the coaxial cable plant 200. Each of the first diplexers 280$_1$–280$_n$, separates incoming information in the 750–1000 MHz band on a corresponding trunk 34 from the upstream and downstream information lying in the 5–750 MHz band. The high frequency upstream information in the 750–10000 MHz band separated by each of the diplexers 280$_1$–280$_n$ passes to a corresponding one of digital regenerators 290$_1$–290$_n$, which digitally regenerates the base band upstream information. Each regenerator 290$_1$–290$_n$ is configured in the manner described in the aforementioned U.S. patent application Ser. No. 08/650,683. A multiplexer 295 multiplexes the output signals from the regenerators 290$_1$–290$_n$ to yield a composite base band digital upstream signal that is supplied to a digital Electrical-to Optical (E/O) converter 330. The E/O converter 330 is identical to the digital E/O converter described in the aforementioned U.S. patent application Ser. No. 08/678,836 (incorporated by reference herein). In particular, the E/O converter 330 transmits the output signal received from the multiplexer 295 in baseband digital format to the head end 120 across a fiber optic link 160$_1$. At the head end 120, the incoming upstream information transmitted across the optical fiber link $160_1$ in baseband digital format is converted to an electrical signal in digital format by a digital Optical-to-Electrical (O/E) converter $170_1$. The output signal of the O/E converter $170_1$ is processed by an upstream digital processor 350.

The transmission by the E/O converter 330 of the composite upstream signal to the head end 120 in baseband digital format affords several advantages. First, by digitally modulating the upstream signal, the digital E/O converter 330 reduces influence of noise at its input and in the fiber and optical receiver. Secondly, the digital E/O converter 330 is less expensive as compared to linear E/O converters, thus reducing the overall cost of each fiber node 180, a distinct advantage. Moreover, similar to the linear E/O 33 of FIG. 1, the digital modulation provided by the E/O converter 330 permits the use of various digital multiplexing techniques, such as Wavelength division multiplexing, or similar techniques, to permit the digitally modulated optically-formatted signals to share a the fiber link $160_1$ in common with analog modulated optically-formatted signals.

As discussed in connection with the fiber node 180, the diplexers $280_1$–$280_n$ separate signals in the 750–1000 MHz frequency band from those in the 5–750 MHz frequency band. Incoming upstream signals in the 5–40 MHz frequency band received at each of the diplexers $280_1$–$280_n$ passes via a corresponding one of cables $340_1$–$340_n$, respectively, to a separate one of a plurality of second diplexers $282_1$–$282_n$. Each of the diplexers $282_1$–$282_n$ separates an incoming upstream signal in the 5–40 MHz band from a downstream signal in the 50–750 MHz band. The incoming upstream signals in the 5–40 MHz band separated by the diplexers $282_1$–$282_n$ are amplified by the amplifiers $262_1$–$262_n$, respectively. A combiner 242 combines the output signals from the amplifiers $262_1$–$262_n$ to yield a composite upstream signal lying in the 5–40 MHz frequency band. A linear E/O converter 222 converts the output signal of the combiner 242 into an optical format for transmission over an optical fiber link $160_3$ to the head end 12. At the head end 12, a linear O/E converter $170_3$ converts the low frequency upstream signal received on the fiber link $160_3$ into an electrical signal for processing by an upstream analog processor 370.

As discussed previously, the head end 120 supplies downstream information, in a linear optical format, to the fiber node 180 via optical fiber link $160_2$. At the fiber node 180, an O/E converter 220, similar to the O/E converter 22 of FIG. 1, converts the optically formatted downstream information into an electrical signal that is split by a splitter 240 into n separate signals. The n separate signals split by the splitter 240 are each amplified by a separate one of amplifiers $260_1$–$260_n$, respectively. Each of the amplifiers $260_1$–$260_n$ supplies its output signal to a corresponding one of the second diplexers $282_1$–$282_n$, which, in turn, passes the downstream signal received from a corresponding amplifier to a separate one of the first diplexers $280_1$–$280_n$. Each of the first diplexers $280_1$–$280_n$ injects the downstream signal received from a corresponding one of the second diplexers $282_1$–$282_n$, respectively, onto a corresponding trunk 34 for distribution, via the coaxial cable plant 200, to the subscribers 14—14.

The foregoing describes a hybrid fiber-coax transmission system 10 in which a portion of the upstream information generated by subscribers is modulated via a carrier to a high frequency band (e.g., 750–1000 MHz) and is then digitally regenerated before being transmitted in baseband digital format to a head end 12. In this way, ingress noise is reduced, and the upstream bandwidth is increased.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for reducing aggregated ingress noise and for increasing upstream bandwidth in a hybrid fiber-coax transmission system that carries information from a head end to a plurality of subscribers via at least one main coax trunk and for carrying information originated by said plurality of subscribers to said head at least in part on said main coax trunk, comprising the steps of:

aggregating onto the main coax trunk information generated by said plurality of subscribers modulating at least a portion of the aggregated upstream signals onto a high frequency band;

digitally regenerating the aggregated upstream signals modulated onto the high frequency band for transmission on the main coax trunk to a fiber node; and optically formatting, at said fiber node, the digitally-regenerated aggregated upstream signals modulated onto the high frequency band in baseband digital format for transmission to a head end.

2. The method according to claim 1 wherein the high frequency band comprises the band of 750–1000 MHz.

3. The method according to claim 2 wherein the portion of the upstream signals not modulated to the high frequency band are modulated to a frequency band of 5–40 MHz.

4. The method according to claim 1 wherein the hybrid fiber-coax system transmits downstream signals in the 50–750 MHz. frequency band.

5. A method of operating a shared hybrid fiber-coax transmission system in which a downstream signal is destined for transmission from a head end to individual subscribers and in which upstream signals are generated by subscribers for transmission to the head end, the method comprising the steps of:

transmitting the downstream signal in an optical format from the head end to a fiber node for conversion to a downstream electrical signal;

transmitting the downstream electrical signal, via a coaxial cable plant, to the individual subscribers;

aggregating, in the coaxial cable plant, upstream signals generated by the subscribers;

modulating, within the coaxial cable plant, at least a portion of the aggregated upstream signals to a high frequency band;

digitally regenerating, within the coaxial cable plant, the portion of the aggregated upstream signals modulated to the high frequency band;

transmitting the digitally regenerated high frequency upstream signals via the coax plant to the fiber node; and optically formatting, at the fiber node, the portion of the aggregated upstream signals that were modulated to a high frequency and digitally regenerated into a baseband digital format for transmission from the fiber node to the head end.

6. The method according to claim 5 further including the steps of:

separating, at the fiber node, the portion of the upstream signals that were modulated to a high frequency and digitally regenerated from downstream and upstream signals that are of a lower frequency received on a common cable from the coaxial cable plant; and further digitally regenerating the portion of the upstream signals that were modulated to a high frequency and digitally regenerated prior to optical formatting.

7. The method according to claim 6 further including the steps of:

separating, at the fiber node, the downstream signals from the upstream signals that are of a lower frequency than portion of the upstream signals modulated to a high frequency;

amplifying the lower frequency upstream signals; and transmitting the lower frequency upstream signals in a linear optical format to the head end.

8. The method according to claim 5 wherein the high frequency band comprises the band of 750–1000 MHz.

9. The method according to claim 7 wherein the lower frequency comprises the frequency band of 5–40 MHz.

10. The method according to claim 5 wherein the hybrid fiber-coax system transmits downstream signals in the 50–750 MHz. frequency band.

\* \* \* \* \*